(12) United States Patent
Ruebbelke et al.

(10) Patent No.: US 9,434,097 B2
(45) Date of Patent: Sep. 6, 2016

(54) DEVICE AND METHOD FOR CALIBRATING FILM TUBING

(75) Inventors: Ingo Ruebbelke, Geseke (DE); Till Bergmann, Lotte (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 408 days.

(21) Appl. No.: 13/505,605

(22) PCT Filed: Nov. 10, 2010

(86) PCT No.: PCT/EP2010/067237
§ 371 (c)(1),
(2), (4) Date: May 2, 2012

(87) PCT Pub. No.: WO2011/058072
PCT Pub. Date: May 19, 2011

(65) Prior Publication Data
US 2012/0211911 A1    Aug. 23, 2012

(30) Foreign Application Priority Data

Nov. 10, 2009  (DE) .................. 10 2009 046 587

(51) Int. Cl.
| | |
|---|---|
| *B29C 49/04* | (2006.01) |
| *B29C 47/00* | (2006.01) |
| *B29C 47/88* | (2006.01) |
| *B29C 47/90* | (2006.01) |
| *B29C 47/94* | (2006.01) |
| *B29K 21/00* | (2006.01) |

(Continued)

(52) U.S. Cl.
CPC ......... *B29C 47/0026* (2013.01); *B29C 47/009* (2013.01); *B29C 47/8835* (2013.01); *B29C 47/903* (2013.01); *B29C 47/908* (2013.01); *B29C 47/94* (2013.01); *B29C 2791/006* (2013.01); *B29C 2791/007* (2013.01); *B29K 2021/00* (2013.01); *B29K 2023/12* (2013.01); *B29L 2023/001* (2013.01)

(58) Field of Classification Search
CPC .................... B29C 47/0026; B29C 47/009
USPC ........ 264/40.1, 235, 346, 210.1; 425/66, 71, 425/326.1, 327, 114, 392
See application file for complete search history.

(56) References Cited

U.S. PATENT DOCUMENTS

| | | | |
|---|---|---|---|
| 2,947,032 A | * | 8/1960 | Taylor, Jr. .................. 425/326.1 |
| 3,235,632 A | * | 2/1966 | Lemmer et al. .............. 264/521 |
| 3,543,334 A | | 12/1970 | Sudo |

(Continued)

FOREIGN PATENT DOCUMENTS

| | | |
|---|---|---|
| AT | 325 845 | 11/1975 |
| DE | 2 005 182 | 8/1971 |

(Continued)

*Primary Examiner* — Nahida Sultana
(74) *Attorney, Agent, or Firm* — Jacobson Holman, PLLC.

(57) ABSTRACT

A device for calibrating membrane tubes which are extrudable by an extrusion die includes a ring along an interior wall with which the extruded membrane tube can be guided, and a cooling liquid supply source which can be used to provide a cooling liquid which can be conveyed to between the interior wall and the membrane tube. The ring includes at least one open chamber in the region where the membrane tube exits the ring, with at least one opening of the open chamber facing the membrane tube and being sealed with at least one permeable webbed piece. A vacuum can be applied to the chamber.

11 Claims, 5 Drawing Sheets

(51) Int. Cl.
   *B29K 23/00* (2006.01)
   *B29L 23/00* (2006.01)

(56) References Cited

U.S. PATENT DOCUMENTS

| | | | |
|---|---|---|---|
| 3,544,667 A | | 12/1970 | Ebert et al. |
| 3,650,644 A | * | 3/1972 | Ebert et al. ............. 425/66 |
| 3,976,410 A | * | 8/1976 | Jack ............. B29C 47/902 264/559 |
| 4,029,452 A | * | 6/1977 | Schippers ......... B29C 47/0023 425/325 |
| 4,294,796 A | * | 10/1981 | Jack ............. B29C 47/902 264/559 |
| 5,200,610 A | * | 4/1993 | Zuckerwar ......... G01L 9/0077 250/227.21 |
| 5,346,384 A | * | 9/1994 | Hegler ............ B29C 47/0023 264/508 |
| 5,676,892 A | * | 10/1997 | Kertscher ......... B29C 47/0016 264/1.28 |
| 5,725,328 A | * | 3/1998 | Schmager ............. E03F 3/06 405/146 |
| 5,976,298 A | * | 11/1999 | Hegler ............ B29C 47/0023 156/244.14 |
| 2008/0264982 A1 | * | 10/2008 | Lee ................. B22D 41/502 222/603 |

FOREIGN PATENT DOCUMENTS

| | | |
|---|---|---|
| DE | 17 04 487 | 9/1971 |
| DE | 21 25 903 | 12/1971 |
| DE | 602 11 541 | 4/2007 |
| EP | 1 436 138 | 5/2006 |
| GB | 1 152 564 | 5/1969 |
| GB | 1 297 465 | 11/1972 |
| GB | 1 410 573 | 10/1975 |
| GB | 1 573 574 | 8/1980 |
| JP | 57 195625 | 12/1982 |

\* cited by examiner

Fig. 1: Prior art

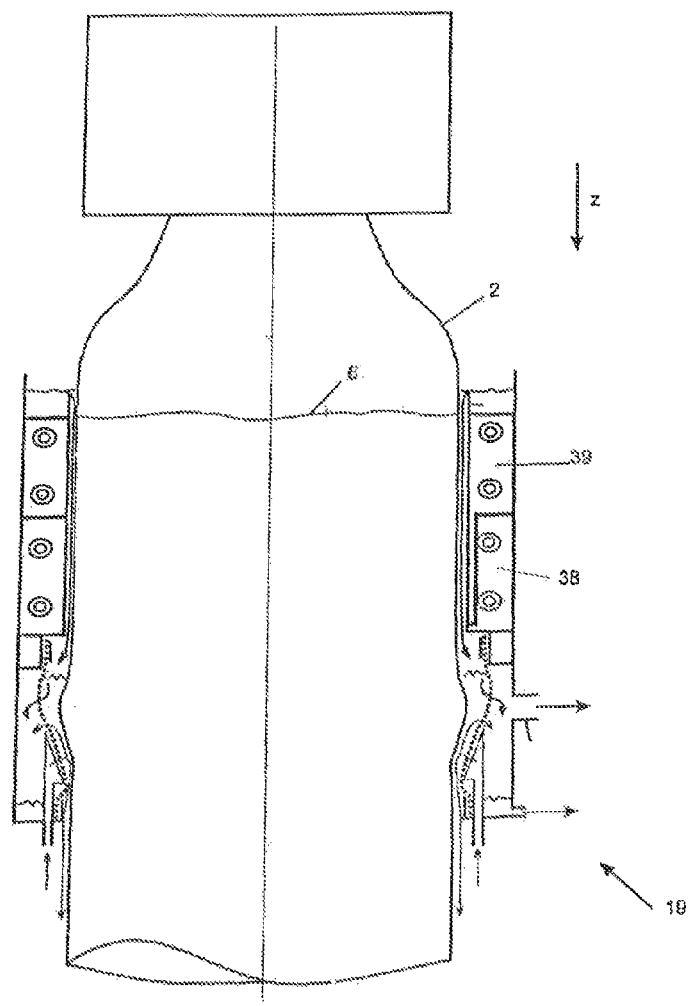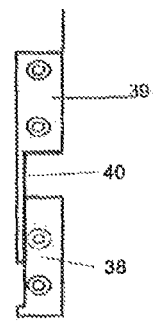

DEVICE AND METHOD FOR CALIBRATING FILM TUBING

CROSS-REFERENCE TO RELATED APPLICATIONS

This is a national stage of PCT/EP10/067237 filed Nov. 10, 2010 and published in German, which claims the priority of German number 10 2009 046 587.1 filed Nov. 10, 2009, hereby incorporated by reference.

BACKGROUND OF THE INVENTION

1. Field of Invention

The invention relates to a device for calibrating membrane tubes which are extrudable by an extrusion die, as well as a method for calibrating such membrane tubes.

2. Description of the Prior Art

Devices for calibrating membrane tubes have long been disclosed. In addition to being used for calibrating the membrane tube, said devices are also used for quickly cooling the membrane tube. In the process, the cooling speed has a considerable impact on the transparency of the future membrane. Generally, a high cooling speed also means high transparency. For this reason, a fluid is used for the cooling, because fluids have a high thermal capacity compared to a gas. Water is often used for the sake of easy handling. However, because the gravitational force has a considerable impact on a fluid compared to a gas, the membrane tubes cooled in this fashion are extruded from an extrusion die toward the direction of the gravitational force, i.e. downward.

This kind of device is described in the disclosure statement DE 2 005 182. The device disclosed there comprises a ring along the interior wall of which the extruded membrane tube can be guided. This means that the interior wall of the ring delimits the space for the membrane tube, so that it is defined by the ring's diameter and hence always has the same diameter as the ring. The ring is often referred to as "calibration sleeve" in technical circles.

Furthermore, the device disclosed there comprises a cooling liquid provision appliance with which a cooling liquid can be provided which can be conveyed to between the interior wall and the membrane tube. The cooling liquid is conveyed through the porous wall of the ring and reaches the space between the exterior surface of the membrane tube and the interior wall of the ring, so that the two are not touching each other, but a good heat exchange is possible. Transparent membranes can be produced in this manner.

However, it is a disadvantage that only membrane tubes made of certain materials can be produced with these kinds of devices. With certain materials, such as for example polypropylene (PP), the just extruded area of the membrane tube located above the frost line is unable to retain the already cooled part of the membrane tube located further down. The so-called inherent retention force is close to zero in some materials. Consequently, these kinds of materials cannot be produced by means of a described device. In order to manufacture transparent membranes made of these kinds of materials, other devices and methods, including for example the production of so-called flat membranes, need to be used. But these kinds of membranes cannot be manufactured efficiently this way.

SUMMARY OF THE INVENTION

Therefore, the object of the present invention is to propose a device based on a device according to DE 2 005 182 with which membrane tubes can be manufactured with high efficiency using other materials.

According to the invention, this object is solved with a device for calibrating membrane tubes which are extrudable by an extrusion die, including a ring along an interior wall with which the extruded membrane tube can be guided in a transport direction. Accordingly, it is intended that the ring comprises at least one open chamber in the region where the membrane tube exits the wherein at least one opening of the chamber is facing the membrane tube and is sealed with at least one permeable element and that a vacuum can be applied to the chamber.

The "outlet region of the ring" refers to the bottom end of the ring. An opening of the chamber can be created for example by integrating a slot surrounding the entire circumference of the interior wall of the ring. In this case, the slot represents the opening. However, said chamber is sealed with an element which is permeable for the cooling liquid. Said element can be a webbed piece, which can also be called membrane. When a vacuum is applied to the chamber, at least part of the cooling liquid between the ring and the membrane tube is then vacuumed off. In other words, a cooling liquid cycle can be generated. Some of the cooling liquid can indeed remain on the membrane tube, but these quantities are relatively small. The crucial effect is that the membrane tube is pulled outward in the region of the element because of the vacuum. Because the membrane tube has already hardened in the outlet region of the ring to the point where its intrinsic retaining force is high enough to retain the sections located further down, the membrane tube can be retained by impressing a force directed radially outward. Said impressed external retaining force is sufficient so that the area of the membrane tube above the frost line is exposed to a lower tensile force. A plurality of the described rings can be used to increase the outward directed force. The provision of a plurality of chambers in one ring can also be useful for this purpose.

In a preferred embodiment of the invention, the chamber completely surrounds the membrane tube. Indeed, a plurality of chambers can be provided in the circular direction. The provision of a chamber surrounding the entire circumference has the advantage that the outward directed retention force is distributed evenly to the circumference of the membrane tube. In this case, the webbed piece is advantageously also continuously encircling the entire circumference.

Moreover, it is advantageous if the webbed piece comprises at least one elastomeric material. This helps achieve that the webbed piece is pulled outward to a greater or lesser extent when the vacuum is varied. This prevents the webbed piece from touching and subsequently damaging the membrane tube.

Different starting materials are conceivable for the webbed material. Advantageously, this can include a permeable fabric. Said fabric can comprise synthetic fibers which can additionally be elastic. However, one or a plurality of solids, which are porous, are generally possible as well. This includes for instance sintered materials. Yet, the permeability can also be achieved with different other materials equipped with drilled holes.

It is advantageous if the ring is interspersed with conduits through which a cooling medium can be guided. The conduits can be part of an additional circuit which is independent of the potentially present circuit for the cooling liquid mentioned above. The cooling medium and the cooling liquid can be different. They may also be heated to different temperatures by means of different temperature setting devices. The mentioned conduits can be used to cool the ring, which ensures the rapid removal of a large quantity of heat from the membrane tube.

In a further advantageous embodiment of the invention, the extension of the ring can be changeable—when viewed from the transport direction of the membrane tube. The cooling distance usable for the membrane tube can be modified in this manner, so that the membrane tube can be cooled to a greater extent. In the process, the ring can for example consist of a plurality of individual annular pieces, which can be stacked. More or fewer annular pieces are stacked on top of each other, depending on the desired cooling distance. The annular pieces can be connectable with each other in a suitable manner. In a different alternative, annular pieces can be retained moveable against each other, wherein some of the annular pieces comprise extensions which cover parts of the interior walls of other annular pieces so that no free areas are created after they have been moved.

To simplify the fastening of the webbed piece on the ring, it is particularly advantageous that the upper edge and the lower edge of the chamber are each provided with a bar around the entire circumference which can be used to fasten the webbed piece. The webbed piece can be fastened on the bars in different fashions. For example, it is possible to provide ledges which can be screwed down on the bars and push the webbed piece against the bars. In so doing, the bars can comprise complementary recesses relative to the ledges such as for example slots to prevent the ledges from protruding beyond the interior circumference of the ring. Clamps are another possibility for fastening the webbed piece. The person skilled in the art is familiar with other fastening methods which can be used here.

It is advantageous if the height of the chamber can be changed in the transport direction of the membrane tube. This allows changing the magnitude of the external force acting on the membrane tube. Prestressing the webbed piece is another option, to prevent it from being pulled as far outward due to the impact of the vacuum.

In another embodiment of the invention, it is provided that an additional ring-shaped body is provided above the lower edge of the chamber, which comprises a surface facing the membrane tube, said surface being inclined compared to the exterior surface of the membrane tube. The surface is tapered in the transport direction of the membrane tube. This helps successively bring back the membrane tube which usually has a larger inner diameter in the region of the chamber opening to its original diameter. The webbed piece extends along the inside of said surface and therefore, the membrane tube does not come into direct contact with the surface.

In the process, it is particularly advantageous if a fluid which is pressurized with overpressure can be applied to the body and if the surface facing the membrane tube is permeable for said fluid. The fluid can for example be a liquid, such as a cooling liquid. However, it can also be provided to use a gas instead, for example air. A gas is particularly advantageous in this instance. The fluid is transported to between the webbed piece and the membrane tube as a result of the overpressure and creates a gliding film between the webbed piece and the membrane tube here, making the contactless return of the diameter of the membrane tube to its original diameter possible.

BRIEF DESCRIPTION OF THE DRAWINGS

Other embodiments of the invention can be derived from the description at hand and the drawing.

In the individual figures:

FIG. 5 shows another embodiment in which the ring comprises a plurality of annular segments that are displaceable against each other FIG. 6 shows a section of FIG. 5, wherein the annular segments have been displaced against each other.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
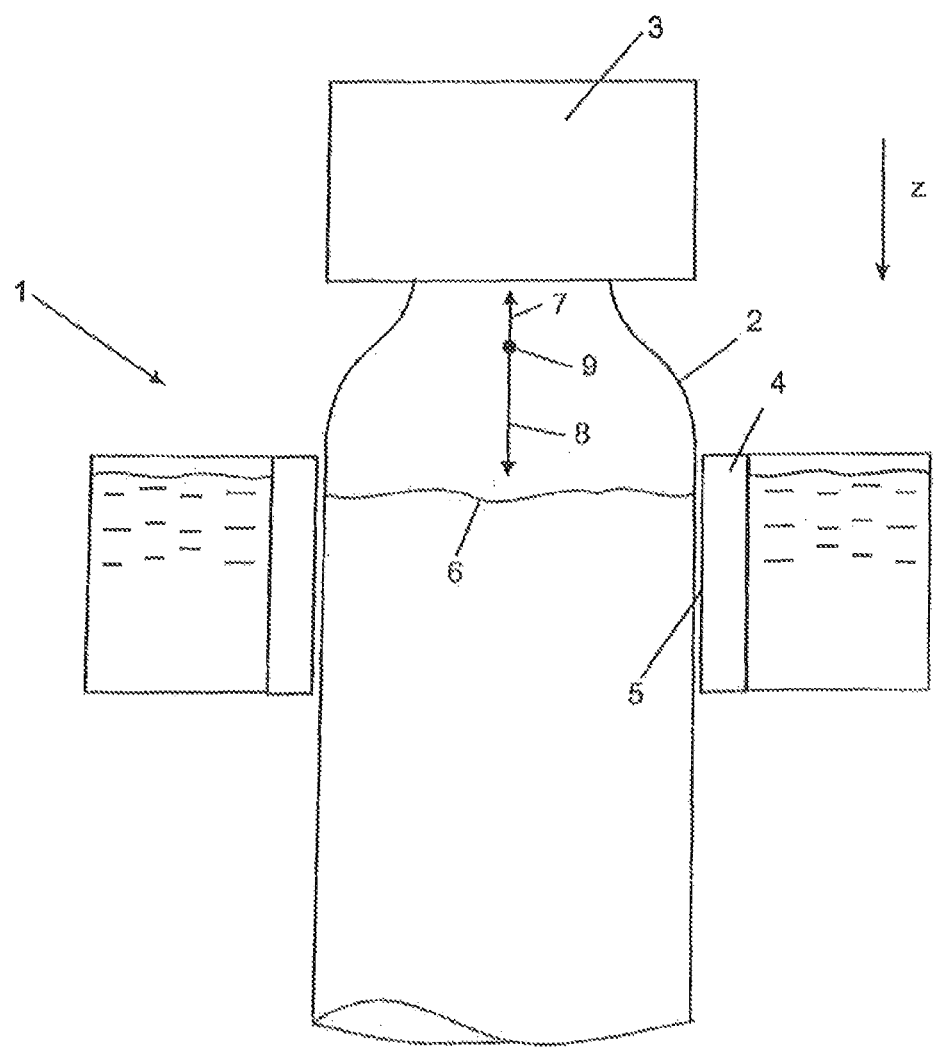
FIG. 1 shows a device according to the prior art

FIG. 1 shows a device 1 for calibrating a membrane tube 2 according to the state of the art disclosed in DE 2 005 182. The membrane tube 2 is extruded downward in the direction z of the gravitational force through a ring-shaped output gap of the extrusion die 3. Normally, a gas is guided into the interior of the membrane tube 2 through a not illustrated supply conduit, said gas comprising an elevated pressure compared to the atmospheric pressure. For this reason, the membrane tube initially continues to expand in the direction z during the transport. Because of the gas content of the membrane tube, it is often referred to as a membrane bubble. The expansion only stops when the membrane tube enters a ring 4 which is deemed an essential component of the device 1. Here, the possible radial expansion of the membrane tube is restricted by the interior wall 5. The membrane tube often hardens into a crystalline or semi-crystalline composite after entering the device. This is achieved by cooling-down to below the melting point of the material of the membrane tube. The line surrounding the entire circumference, which is defined by the points of the transition from molten to solid, is also known as frost line 6.

The forces acting on the membrane tube essentially include the inherent retention force 7 of the membrane tube which is associated with its stability, as well as the tensile force 8, which is mainly the result of the weight of the membrane tube and the forces used up by the driven membrane transport appliances (for example take-off rollers). The force ratios for certain materials such as PP are illustrated by the length of the arrows 7 and 8 for a point 9 in the membrane tube 2 above the frost line. Arrow 7 represents the maximum retention force the membrane tube is capable of applying. This arrow is considerably shorter than arrow 8, which represents the tensile force. The membrane will inevitably rupture above the frost line. Certain materials cannot be made into a plastic membrane tube with the desired transparency using the device according to the prior art.

Figure 2:
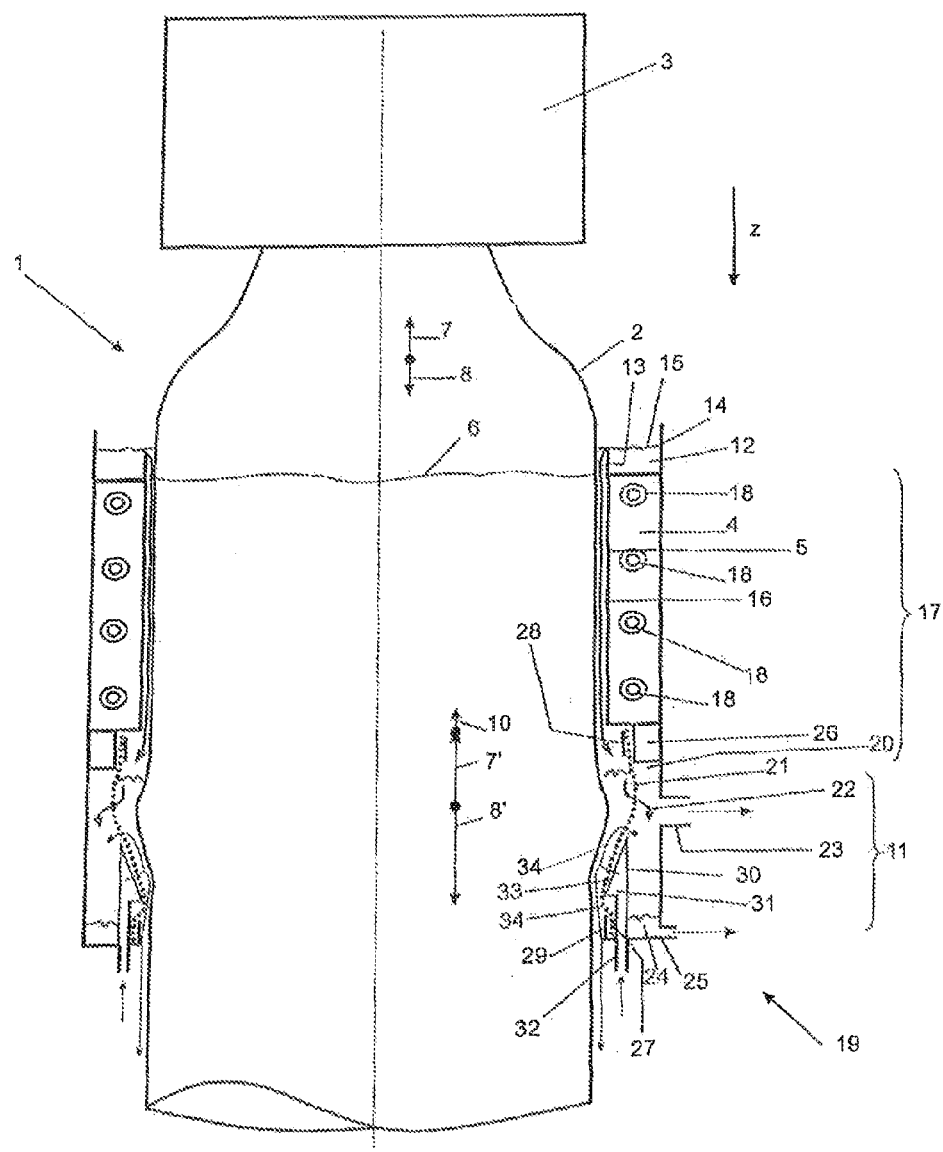
FIG. 2 shows a device according to the invention

This can be remedied with a device explained below based on the exemplary embodiment illustrated in FIG. 2. It is essential for the invention that a device 11 is provided which exerts a force in the radial direction onto the membrane tube in order to generate a force of kinetic friction 10 which is opposed to the tensile force 8. An example of said device 11 is described in detail below.

Below the frost line 6, the tensile force 8' is acting on the membrane tube. Now it is not only the retention force 7' which is greater above the frost line compared to the retention force 7 that is opposed to this force, but also the force of kinetic friction 10. The forces are advantageously adjusted in such a way that the membrane tube is transported with a desired speed, albeit without rupturing. The force ratios at the points above the frost line have changed compared to the prior art. Because now the membrane tube no longer pulls with its full weight, but only with the weight of the tube section up to the height where the radial force is applied, the tensile force 8 is now smaller than the maximum retention force 7. Materials whose retention force 7 is not very high can be manufactured with a device according to the invention.

In this exemplary embodiment, the ring 4 firstly comprises at least one upper trench whose wall 13 facing the membrane tube is lower than the exterior wall 14, allowing as much cooling liquid 15, hereinafter called water for short, to be poured into the trench as necessary for it to pass the wall 13 and enter between the interior wall 5 of the ring 4 and the membrane tube 2. The water flow is illustrated by means of the arrow 16. The upper part 17 of the ring 4 is equipped with conduits 18 through which a cooling medium can be guided. Said cooling medium removes the heat that is withdrawn from the tube 2 through the water 15 and from the ring 4.

In order to exert a radial force of the membrane tube 2, the lower part 19 of the ring 4 comprises a chamber 20 surrounding the entire circumference, which comprises an opening again surrounding the entire circumference on the side facing the membrane tube 2. However, said chamber 20 is sealed with a webbed piece 21 surrounding the entire circumference, which preferably consists of permeable fabric. The webbed piece 21 is illustrated as a dotted line in order to emphasize the permeability for the cooling liquid 15. The passage of the water itself is symbolized with the arrow 22.

In order to now be able to exert a radial force onto the membrane tube 2, the chamber is connected via the aspirating hole 23 with a not illustrated vacuum generation appliance used to generate a vacuum in the chamber 20. However, the vacuum is selected in such a way that the water is not vacuumed off, but can accumulate in the channel 24, so that it can be removed via the supply joint 25. Vacuum refers to the pressure that is lower relative to the atmospheric pressure. The pressure difference ranges from 1 to 20 mbar, preferably from 1 to 10 mbar, in particular 1 to 5 mbar. These kinds of pressure differences, which need to be set depending on the material of the membrane tube and/or depending on its thickness and/or other parameters, result in an adequate force of kinetic friction while preventing the membrane tube from being pulled too closely to the webbed piece 21, which would result in scratches or other damages of the membrane tube.

One bar 26, 27 each is provided at the upper edge and at the lower edge of the chamber for fastening the webbed piece 21, said bar being used to fasten the webbed piece 21 on the upper or lower edge, respectively. Generally, different fastening options are available. A ledge 28, 29 connected with the bars 26 and 27, for instance by screwing it on to clamp down the edges of the webbed piece, is advantageous. However, part of the surface amounting to at least 10%, preferably at least 20%, is unsupported, meaning that the webbed material is not resting on a body on the side facing away from the membrane tube.

An additional body 30 surrounding the entire circumference and equipped with cavities 31 is provided on the outflow side of the chamber 20. A fluid can be supplied to said cavity 31 via the supply opening 32, said fluid being pressurized with an overpressure. The wall 33 facing the membrane tube 2 is permeable for said fluid, so that it is able to pass through said wall and the webbed piece 21 covering the wall 33. The fluid forms a fluid film which carries the membrane tube contactless. The gradient of the fluid flow is represented by the arrow 34. The fluid flow is divided into two components. While one part is carried along by the membrane tube and leaves the device 1 in the transport direction z of the membrane tube 2, a second part moves upward against the transport direction due to the vacuum in the chamber 20 and is aspirated via the chamber 20. If air or a different gas is used as fluid, it can act as a seal and largely prevent the cooling liquid 15 from exiting in the downward direction.

The wall 33 is tapered toward the transport direction of the membrane tube 2, meaning that the membrane tube can successively be returned to its original diameter that it had in the upper area 17 of the ring 4. In the process, the surface 33 advantageously has an angle between 0 and 30 degrees, in particular between 5 and 20 degrees, with the transport direction z.

Figure 3:
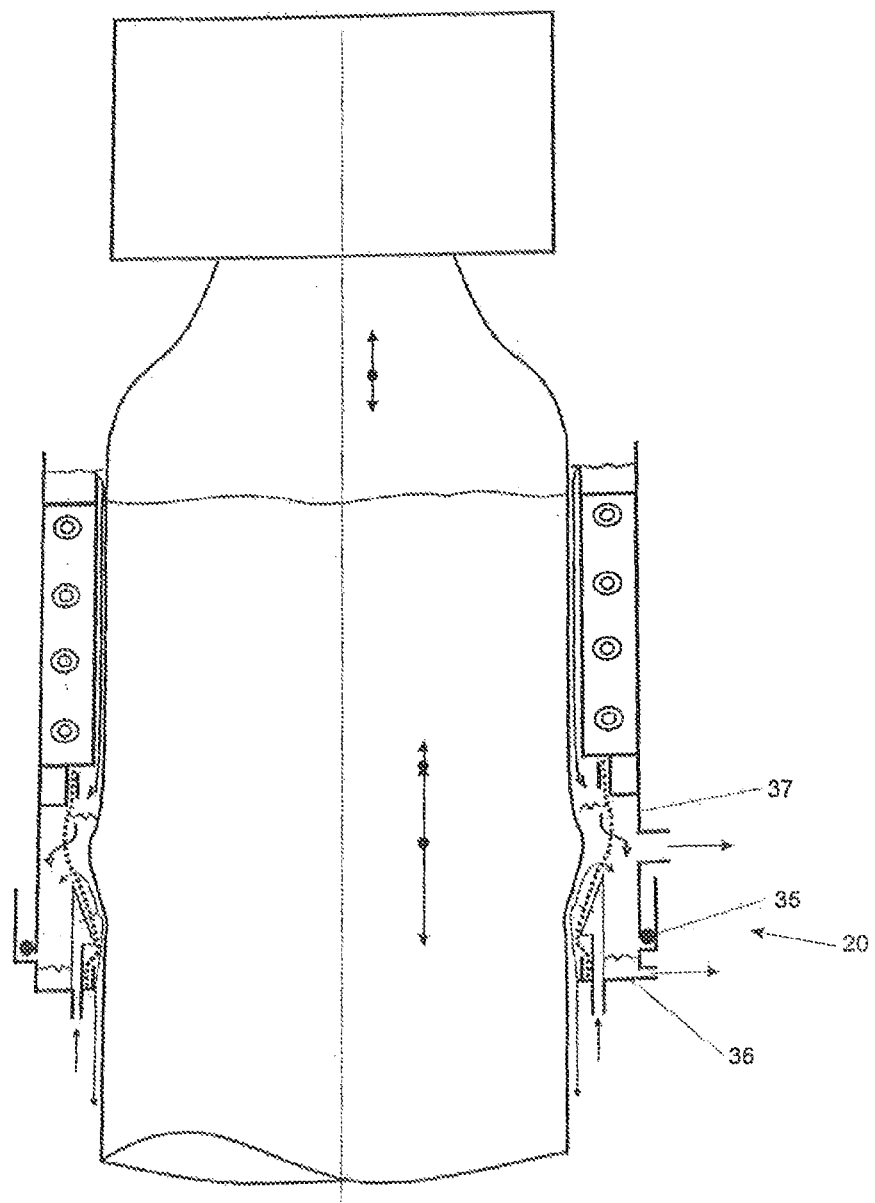
FIG. 3 shows another embodiment of a device according to the invention

FIG. 3 shows another embodiment of the device according to the invention. Said embodiment corresponds to FIG. 2, but the expansion of the chamber 20 can be changed in the transport direction z. For this purpose, the chamber 20 is divided into two parts 36 and 37, which are sealed against the surroundings with the seal 35. The person skilled in the art is familiar with devices for setting the height and their arrangement and no further explanation is therefore required here.

Figure 4:
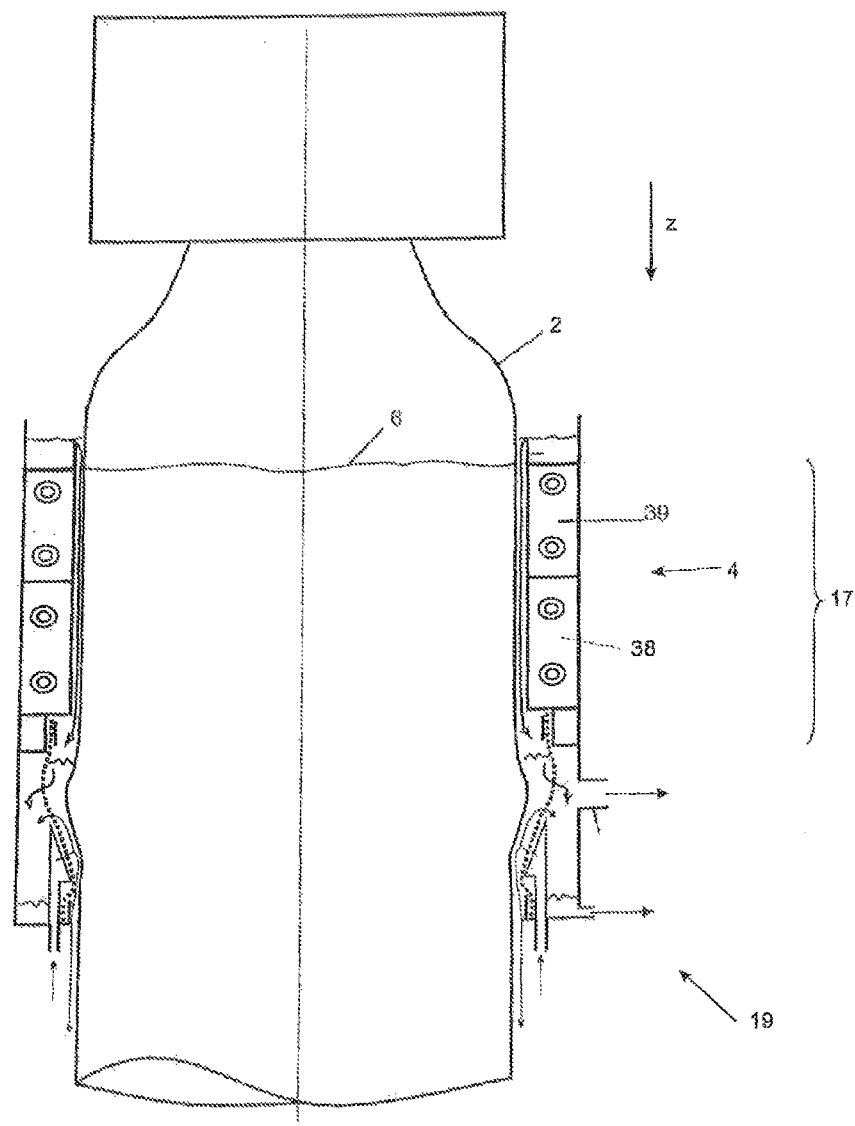
FIG. 4 shows another embodiment in which the ring comprises a plurality of annular segments

The ring 4 in FIG. 4 consists of annular segments. In the present example, these are the annular segments 38 and 39. Additional annular segments can be added or one of the annular segments can be removed, depending on the desired or required cooling distance.

In FIG. 5, one of the annular segments, here annular segment 39, comprises an extension 40 which overlaps with the interior wall of another annular segment, here annular segment 38. The interior surfaces of the annular segments 38 and 39 as well as the extension 40 are preferably designed such that the ring is able to perform its calibration function as well as possible. For this purpose, in particular sharp edges should be avoided.

In FIG. 6, the two annular segments 38 and 39 have been displaced against each other, thus lengthening the cooling distance. The extension 40 still partly overlaps with the interior surface of the annular segment 38, meaning that the cooling distance has not been interrupted.

The embodiment according to FIG. 5 can also be combined with the embodiment according to FIG. 4. It is for instance conceivable that several pairs of corresponding annular segments are arranged in succession, wherein pairs can be added or removed. This results in superior variability of the cooling distance.

Different characteristics have been disclosed in the present disclosure. Any combinations of characteristics are also deemed included, even if they are not explicitly described. As a result, many further embodiment variants which reflect the inventive idea are conceivable.

| | Reference list |
|---|---|
| 1 | Device for calibrating a membrane tube 2 |
| 2 | Membrane tube |
| 3 | Extrusion die |
| 4 | Ring |
| 5 | Interior wall |
| 6 | Frost line |
| 7 7' | Maximum retention force |
| 8 8' | Tensile force |
| 9 | Point above the frost line |
| 10 | Force of kinetic friction |
| 11 | Appliance for exerting a radial force onto the membrane tube |
| 12 | Upper trench |
| 13 | Wall of the upper trench |
| 14 | Exterior wall |
| 15 | Cooling fluid |
| 16 | Flow of the cooling fluid 15 |
| 17 | Upper part of the ring 4 |
| 18 | Conduit |
| 19 | Lower area of the ring 4 |
| 20 | Chamber surrounding the entire circumference |
| 21 | Webbed piece surrounding the entire circumference |
| 22 | Arrow |
| 23 | Aspirating hole |
| 24 | Channel |
| 25 | Supply joint |
| 26 | Bar |
| 27 | Bar |
| 28 | Ledge |
| 29 | Ledge |
| 30 | Body |
| 31 | Cavity |
| 32 | Supply opening |
| 33 | Wall |
| 34 | Fluid flow |
| 35 | Seal |
| 36 | Lower part of the chamber 20 |
| 37 | Upper part of the chamber 20 |
| 38 | Annular segment |
| 39 | Annular segment |
| 40 | Extension |
| z | Direction of the force of gravity/transport direction of the membrane tube |

What is claimed is:

1. A device for calibrating membrane tubes which are extrudable by an extrusion die, comprising:
   a ring having an interior wall, along which the extruded membrane tube can be guided in a transport direction (z),
   a cooling liquid source device with which a cooling liquid can be provided, said cooling liquid being conveyed to between the interior wall and the extruded membrane tube,
   wherein the ring includes at least one open chamber in a region where the extruded membrane tube exits the ring, wherein at least one opening of the at least one open chamber is facing the extruded membrane tube and is sealed by at least one permeable element, and wherein a vacuum can be applied to the at least one open chamber,
   a ring-shaped body provided downstream of an upper edge and upstream of a lower edge of the at least one open chamber in the transport direction (z) of the extruded membrane tube, said ring-shaped body including a surface facing the extruded membrane tube which is inclined relative to an exterior surface of the extruded membrane tube,
   a fluid pressurized with overpressure which can be applied to the ring-shaped body,
   the surface of the ring-shaped body facing the extruded membrane tube being permeable for said fluid, with the surface being covered with the at least one permeable element, and
   one part of a resulting fluid flow flowing against the transport direction (z) because of the vacuum in the at least one open chamber.

2. The device according to claim 1, wherein the at least one open chamber completely surrounds the extruded membrane tube.

3. The device according to claim 1, wherein the at least one permeable element is a webbed piece.

4. The device according to claim 3, wherein the webbed piece includes at least one elastomeric material.

5. The device according to claim 1, wherein the at least one permeable element is a permeable fabric.

6. The device according to claim 1, wherein the ring is interspersed with conduits through which a cooling medium can be guided.

7. The device according to claim 1, wherein an expansion of the ring is changeable in the transport direction (z) of the extruded membrane tube.

8. The device according to claim 3, wherein an upper edge and the lower edge of the at least one open chamber are each provided with a bar surrounding an entire circumference thereof, which can be used for fastening the webbed piece.

9. The device according to claim 1, wherein a height of the at least one open chamber can be changed in the transport direction (z) of the extruded membrane tube.

10. A device for calibrating a membrane tube extruded with an extrusion die, said device comprising:
    a ring having an interior wall that guides the extruded membrane tube in a transport direction (z), with a cooling liquid being provided to a location between the interior wall and the extruded membrane tube;
    a chamber disposed where the extruded membrane tube exits the ring, with an opening of the chamber facing the extruded membrane tube and being covered by a permeable element, such that a vacuum can be applied to the extruded membrane tube via the chamber so as to remove an amount of the cooling liquid; and
    a ring-shaped body disposed downstream of a first part and upstream of a second part of the chamber relative to the transport direction (z), the ring-shaped body including a surface facing the extruded membrane tube that is inclined relative to an exterior surface of the extruded membrane tube,
    with the surface of the ring-shaped body being covered with the permeable element and being permeable for a pressurized fluid that is applied thereto,
    such that a portion of a flow of the fluid is countercurrent to the transport direction (z) as a result of the vacuum applied in the chamber.

11. The device according to claim 10, wherein the ring-shaped body and the pressurized fluid provide a cushion for the extruded membrane tube as it passes the chamber and a diameter of the extruded membrane tube is reduced.

* * * * *